United States Patent Office

3,487,123
Patented Dec. 30, 1969

3,487,123
CASTING AND IMPREGNATING RESINS CONTAINING ORGANOSILOXANES
Ignaz Bauer, Siegfried Nitzsche, and Rudolf Riedle, Burghausen, Upper Bavaria, Germany, assignors to Wacker-Chemie G.m.b.H., Munich, Bavaria, Germany
No Drawing. Filed Dec. 4, 1967, Ser. No. 687,452
Claims priority, application Germany, Dec. 7, 1966, W 42,928
Int. Cl. C08f 21/00, 21/02
U.S. Cl. 260—827                    6 Claims

ABSTRACT OF THE DISCLOSURE

Heat-hardenable pouring and impregnating resin formulations are introduced comprising an alkenylorganosiloxane polymer, an olefinic organic compound, a free radical catalyst having a half-life of at least 3 hours in toluene and a second free radical catalyst having a half-life of less than 2.5 hours in toluene at 110° C.

BACKGROUND OF THE INVENTION

This invention introduces novel organopolysiloxane-olefinic organic compound mixtures particularly useful as heat-hardenable impregnating resins.

Various types of solvent-free, heat-curable pouring and impregnating resins based on organosiloxane polymers are known and described in the art. These resins include those which may be described as heat-curable resins based on organosiloxane polymers having an average of at least one olefinically unsaturated organic radical bonded to silicon through a carbon-silicon linkage for each 10 silicon atoms admixed with olefinically unsaturated pure organic compounds and polymers employing as curing agents heat activated free radical formers having half-lives of at least 3 hours at 110° C. in toluene. However, such impregnating resins suffer the disadvantage that they require temperatures above 150° C. in order to gel within a practical time period (i.e. within about 10 minutes). Thus, these resin formulations run off the articles which are coated or impregnated therewith during the initial gelation period of the cure schedule. The use of high temperatures (i.e. 150° C. or more) to secure gelation of the resin is not practical because the resin formulations become even more fluid at advanced temperatures and the run-off problem is even more severe until gelation occurs. Furthermore, equipment and techniques for application and cure of resins on base materials have been designed for operation at temperatures not exceeding about 120° C. and cannot be used at temperatures in the range of 150° C. and higher.

The disadvantages noted above have severely restricted the growth of the market for impregnating resins based on alkenylorganopolysiloxanes. This has been true despite the recognized physical and chemical strength as well as high temperature stability and excellent electrical insulation properties exhibited by such resins.

It is the object of this invention to introduce a novel impregnating resin composition based on alkenylorganopolysiloxanes which avoids the above noted disadvantages. Thus, the object of this invention is achieved with a resin formulation which will gel and avoid excessive run-off at moderate cure temperatures in a reasonable length of time (e.g. 120° C./10 minutes). Other objects and advantages of this invention are detailed in or will be apparent from the disclosure and claims following.

This invention is directed to a heat-curable, pourable, impregnating resin composition consisting essentially of (a) an organosiloxane polymer having at least one olefinically unsaturated organic substituent for each 10 silicon atoms present, the remainder of the organic substituents being selected from monovalent hydrocarbon radicals and substituted hydrocarbon radicals, (b) an organic compound having olefinic C=C unsaturation, (c) a free radical forming compound having a half-life in toluene at 110° C. of at least 3 hours and (d) a free radical forming compound having a half-life in toluene at 110° C. of not more than 2.5 hours.

The organopolysiloxanes employed herein are known materials prepared by well-documented methods. The operable polymers can be defined by the unit formula

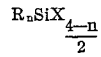

$$R_nSiX_{\frac{4-n}{2}}$$

where each R is a monovalent hydrocarbon or substituted hydrocarbon radical, at least 0.1 R per silicon atom containing olefinic unsaturation, $n$ has an average value in the range from 0.9 to 2.4, X is an oxygen atom present as SiOSi linkages or a divalent hydrocarbon radical linking adjacent silicon atoms in the molecule, at least 50 percent of the X groups being oxygen atoms. These polymers are essentially free of silicon bonded hydroxyl groups and can be linear, cyclic and/or three-dimensional.

The organic substituents represented by R in the unit formula above can be alkenyl radicals such as vinyl, allyl, hexenyl and $CH_2=CH(C_yH_{2y})-$ where $y$ is 0–18; cycloalkenyl radicals such as cyclopentenyl, cyclohexynyl and cyclooctadecenyl; alkyl radicals such as methyl, ethyl, propyl, dodecyl, octadecyl and $C_yH_{2y+1}$, where $y$ is 0–18; aryl radicals such as phenyl, xenyl, naphthyl, and phenanthryl; aralkyl radicals such as benzyl, beta-phenylethyl; and xylyl and alkaryl radicals such as tolyl and ethylphenyl. The substituted organic radicals include primarily the halogenated derivatives of those listed above such as ortho-, meta- and para-chlorophenyl radicals as well as chloromethyl, fluoropropyl, bromocyclohexyl and chlorobenzyl radicals. At least 1 of the R groups per 10 silicon atoms must contain aliphatic unsaturation (i.e. a C=C linkage) and preferably such groups are vinyl or allyl groups (i.e. the preferred siloxanes have at least one vinyl and/or allyl group per ten silicon atoms). The balance of the R groups are preferably methyl and/or phenyl radicals.

The operable siloxanes can be homopolymers, copolymers and mixtures thereof and can contain any possible combination of units of the formulae $SiO_{4/2}$, $RSiO_{3/2}$, $R_2SiO$ and $R_3SiO_{1/2}$ so long as the R/Si ratio is in the range 0.9/1 to 2.4/1 and the required proportion of aliphatically unsaturated R groups is present. In addition to the oxygen atoms, linking adjacent silicon atoms (i.e. Si—O—Si) up to 50 percent of the linkages can be silcarbane linkages (e.g. $SiCH_2Si$ and $SiC_6H_4Si$).

The operable organosiloxane polymers are fluid but may be extremely viscous requiring only to be soluble in benzene and other organic solvents. Preferably, however, the viscosity of the siloxane employed will be in the range from 20 to 500,000 cs. at 25° C. and most preferably in the range from 200 to 20,000 cs. at 25° C.

The preferred organopolysiloxanes employed herein are those containing (a) 0.1 to 10 mol percent of units of the formula $R'_3SiO_{1/2}$, (b) 20 to 99.9 mol percent of units of the formula $R''_2SiO$ and (c) any remaining units being of the formula $R''SiO_{3/2}$, wherein each $R'$ is a methyl or phenyl radical and each $R''$ is a vinyl, methyl or phenyl radical, said polymer having a vinyl radical per silicon ratio of at least $1/10$, said organopolysiloxanes having a viscosity in the range from 200 to 20,000 cs. at 25° C.

Further illustration and definition of operable organopolysiloxanes can be found in U.S. Patent Nos. 2,894,930, issued July 14, 1959, No. 2,934,464 issued Apr. 26 1960, No. 3,137,665 issued June 16, 1964, and No. 2,714,099, issued July 26, 1955.

The olefinically unsaturated organic compounds and polymers employed herein include those organic materials previously employed in mixture with siloxane resins in potting and impregnating resin formulations. These organic materials are well known and can be prepared by methods well known in the art. The operable organic compounds and polymers are characterized by the presence of one or more aliphatically unsaturated compounds selected from aliphatic, cycloaliphatic, aliphatic aromatic and heterocyclic compounds which are miscible with the organopolysiloxanes. Examples of such compounds are aralkenyl compounds such as styrene, methylstyrene, 2,5-dichlorostyrene and divinylbenzene; acrylic acid esters such as methylacrylate and ethylacrylate; and methacrylic acid esters such as ethylmethacrylate; unsaturated cycloaliphatic compounds such as 1,3-cycloheptene and 3,7-dimethyl-1,3,6-octatriene, triallylcyanurate, 2-methylbutadiene-1,3 and olefinically unsaturated polyester resins which are fluid at the temperatures selected for application of the mixtures of this invention to the articles which are to be coated or impregnated. Other operable unsaturated organic compounds are set forth, for example, in U.S. Patents No. 3,249,581 and No. 2,958,707.

Mixtures of various olefinically unsaturated organic compounds can be employed. Particularly useful herein are those olefinically unsaturated organic compounds having more than one aliphatic double bond in the molecule, particularly divinylbenzene. The olefinically unsaturated organic compounds are empoyed in quantities of from 1 to 33 percent by weight, preferably 5 to 20 percent by weight based on the total weight of the impregnating resin formulation. In other words, for 100 parts by weight of organopolysiloxane one may employ 1 to 50 parts by weight of the defined organic compound.

The curing agents or catalysts employed herein are free radical formers. The first such agent has a relatively high activation temperature and has a half-life in toluene at 110° C. of at least 3 hours. Any free radical forming compound which will effect polymerization of compounds having unsaturated aliphatic bonds and the stated minimum half-life can be employed. Particularly useful and illustrative of these free-radical forming agents are oil soluble organic peroxides such as dicumylperoxide, cumene hydroperoxide, 2,2-bis(tertiary-butyl-peroxy)-butane, tert.-butylperlaurinate, tert.-butylperbenzoate, and tert.-butylhydroperoxide. Preferred because of ready availability and economic factors is the dicumylperoxide. The free-radical former having a minimum 3 hour half-life at 110° C. in toluene is employed in proportions of from 0.5 to 3.0 percent by weight and preferably 1.5 to 2.5 percent by weight based on the organopolysiloxane present.

A second free-radical former having a lower activation temperature as exhibited by a half-life of not more than 2.5 hours at 110° C. in toluene and suitable for polymerization of olefinically unsaturated organic compounds is also employed.

It is preferred that these free-radical forming agents be soluble in the siloxane-organic resin system herein and remain stable on storage in the temperature range from −10° C. to 25° C. Illustrative of such free-radical forming agents are tert.-butyl peroctoate, tert.-butyl perisobutyrate, methylethylketonehydroperoxide, benzoyl peroxide, chlorobenzoylperoxide, bis-(dichlorobenzoyl)peroxide, dicyclohexylperoxide-2, cyclohexanone-peroxide, and laurol peroxide, as well as non-peroxide radical formers such as azo-isobutyric acid-dinitrile. The free-radical forming agents having lower threshold of activity are employed in proportions of from 0.5 to 20 percent by weight, preferably 1 to 15 percent by weight, based on the weight of olefinically unsaturated organic compound present.

The half-life value of the free-radical catalysts is measured as that time required to decompose a given amount of said catalyst to one-half its original weight. This is measured herein at 110° C. and in a toluene environment as is customarily done in the art. Such half-life data can frequently be obtained from the literature and is easily measured by known methods.

In addition to the four required ingredients described above, the compositions of this invention can contain known additives customarily employed in pouring, potting and impregnating resin formulations. Such materials include fillers such as various silicas, aluminum silicate, quartz flour, calcium carbonate, zinc oxide, titania, and/or iron oxide. Such fillers can be pretreated by known methods to exhibit hydrophobic groups on their surfaces (e.g. butoxy- or trimethylsiloxane groups). Pigments and other materials can also be added.

The pouring, potting and impregnating resin compositions of this invention are useful for embedding electrical apparatus, impregnating electrical coils, transformers and other apparatus as well as for preparing laminates and other forms of glass-fiber reinforced molded articles.

The resin formulations of this invention can be processed in accordance with standard procedures developed in the industry and art wherein the resins are employed. After molding and gelation, the resins can be cured in accordance with known procedures and at known temperature-time schedules (e.g. 150° to 200° C./1–8 hours).

In the following examples, all parts are calculated on a weight basis, percentage specifications are on a mol percentage basis. The times given in these examples for initiating and ending the gelation were determined according to the instructions of the Verband Deutscher Elektrotechniker (VDE 0360–Part 2, The Union of German Electrical Workers) immersing resins in the specification in the following manner.

A sample of the resin is placed at a depth of 7 to 8 cm. in a test tube of 18 mm. inside diameter. A glass tube is pushed to the bottom of the test tube through a glass rod stuffed through a cork closure. The test tube with the resin and the glass rod is then placed on a fluid bath heated to the gelation temperature which is given. The length of time for which the test tube is placed on the fluid bath serves as the initiation for the time necessary for the gelation and is the starting point for measuring the times from the beginning to the end of the gelation. The beginning of the gelation then takes place when the fluid resin no longer drops off of the glass rod when this is pulled out, but rather pulls a thread or a number of threads. The end of the gelation takes place when the glass tube can no longer be moved in the resin and the test tube plus its contents may be picked up with the glass rod.

Example 1

Mixtures were prepared at 60° C. containing 100 parts of a linear organopolysiloxane consisting of 40 percent diphenylsiloxane units, 20 percent dimethylsiloxane units, 36 percent vinylmethylsiloxane units and 4 percent trimethylsiloxane units with a viscosity of 5,000 cs. at 25° C. and the additives in the quantities set forth in the following Table I. The time necessary for gelation was measured and is set forth in the table.

TABLE I

| No. | Additive | Additive Quantities in Parts | Gelation Temperatures, °C. | Beginning of Gelation in Minutes | End of Gelation in Minutes |
|---|---|---|---|---|---|
| 1 | Divinylbenzene<br>Dicumylperoxide<br>Tertiary-butyl peroctoate | 5<br>2<br>0.25 | 100 | 10 | 15 |
| 2 | Divinylbenzene<br>Dicumylperoxide<br>Tertiary-butyl peroctoate. | 5<br>2<br>0.25 | 120 | 5½ | 10½ |
| 3 | Divinylbenzene<br>Dicumylperoxide<br>Tertiary-butyl peroctoate. | 10<br>2<br>0.5 | 80 | 9½ | 12½ |
| 4 | Divinylbenzene<br>Dicumylperoxide<br>Tertiary-butyl peroctoate. | 10<br>2<br>0.5 | 100 | 6 | 7½ |
| 5 | Dicumylperoxide | 2 | 100 | (*) | (*) |
| 6 | do | 2 | 120 | 49 | 64 |
| 7 | do | 2 | 130 | 21 | 24 |
| 8 | do | 2 | 140 | 11 | 12½ |
| 9 | do | 2 | 150 | 6 | 6¾ |
| 10 | Divinylbenzene<br>Dicumylperoxide | 10<br>2 | 120 | 50 | 65 |

* Will not gel.

Tests 5 to 10 are comparative tests. At temperatures above 130° C. the organopolysiloxane is so thinly fluid that it will easily drip off all surfaces to which it is applied and, for example, material impregnated therewith such as glass cloth exhibits extremely uneven coating and bare spots from which the resin has totally run off.

Hardening of the mixtures described in Table I under Nos. 1 to 4 by heating for 6 hours at 150° C. after gelation will yield hard tough articles which will display no pores and which will display a high flexural strength.

Example 2

Mixtures of 100 parts of a linear organopolysiloxane of 20 percent diphenylsiloxane units, 10 percent phenylmethylsiloxane units, 15 percent dimethylsiloxane units, 30 percent vinylmethylsiloxane units, 4 percent monophenylsiloxane units, 3 percent monomethylsiloxane units, 8 percent monovinylsiloxane units, and 10 percent trimethylsiloxane units with a viscosity of 15,000 cs. at 25° C. and the additives given in the following Table II are tested for the time necessary for gelation.

The results given in Table II are obtained.

TABLE II

| No. | Additive | Additive Quantities in Parts | Gelation Temperatures, °C. | Beginning of Gelation in Minutes | End of Gelation in Minutes |
|---|---|---|---|---|---|
| 1 | Triallylcyanurate<br>Dicumylperoxide<br>Benzoylperoxide | 5<br>2<br>1 | 100 | 12 | 15 |
| 2 | Triallylcyanurate<br>Dicumylperoxide<br>Benzoylperoxide | 5<br>2<br>1 | 120 | 8 | 12 |
| 3 | Triallylcyanurate<br>Dicumylperoxide<br>Benzoylperoxide | 10<br>2<br>1 | 100 | 9 | 12 |
| 4 | Triallylcyanurate<br>Dicumylperoxide<br>Benzoylperoxide | 10<br>2<br>1 | 120 | 6 | 9 |
| 5 | Triallylcyanurate<br>Dicumylperoxide | 5<br>2 | 120 | 300 | 400 |
| 6 | Triallylcyanurate<br>Dicumylperoxide | 5<br>2 | 150 | 6 | 7 |
| 7 | Triallylcyanurate<br>Benzoylperoxide | 5<br>2 | 120 | 25 | 50 |
| 8 | Triallylcyanurate<br>Benzoylperoxide | 5<br>2 | 150 | 15 | 30 |

Tests 5 to 8 are comparative tests. Aside from the fact that with test 8 the beginning of gelation takes place only after 15 minutes even at 150° C., a product interspersed with pores is obtained.

Hardening of the mixtures described in Table II under Nos. 1 to 4 by heating for 6 hours at 150° C. after the gelation will yield hard tough articles which display no pores and which display high flexural strength.

That which is claimed is:

1. A heat-curable organosiloxane-organic resin composition consisting essentially of (a) 100 parts by weight of an organopolysiloxane of the unit formula

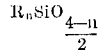

where $n$ has an average value in the range from 0.9 to 2.4, each R is a monovalent hydrocarbon or halogenated hydrocarbon radical, there being 1 or more R groups containing aliphatic unsaturation per 10 silicon atoms, the organopolysiloxane having a viscosity in the range from 20 to 500,000 cs. at 25° C., (b) 1 to 50 parts by weight of an organic compound containing olefinic unsaturation selected from aliphatically unsaturated aliphatic, cycloaliphatic, aliphatic-aromatic and heterocyclic compounds which are miscible with organopolysiloxane (a), (c) 0.5 to 3 parts by weight of a free-radical forming catalyst having a half-life at 110° C. in toluene of at least 3 hours and (d) 0.5 to 20 percent by weight based on the weight of organic compound (b) of a free-radical forming catalyst having a half-life at 110° C. in toluene of not greater than 2.5 hours.

2. The resin composition of claim 1 further characterized in that the organopolysiloxane is a copolymer of 0.1 to 10 mol percent of units of the formula $R_3Si_{1/2}$ where R is methyl or phenyl, 20 to 99.9 mol percent of units of the formula $R'_2SiO$ where each R' is vinyl, methyl or phenyl and any remaining units in said copolymer being of the formula $R'SiO_{3/2}$ where R' is as above defined, said organopolysiloxane having a viscosity at 25° C. in the range from 200 to 20,000 cs. and a vinyl to silicon ratio of at least 1/10.

3. The resin composition of claim 1 further characterized in that the organic compound (b) contains more than one aliphatic double bond in each molecule.

4. The resin composition of claim 1 wherein the organic compound (b) is selected from the group consisting of styrene, methylstyrene, divinylbenzene, ethylacrylate, methylacrylate, ethylmethacrylate, methylmethacrylate, triallylcyanurate, 2,5-dichlorostyrene, 1,3-cycloheptene, 3,7-dimethyl-1,3,6-octatriene and 2-methylbutadiene-1,3.

5. The resin composition of claim 1 further characterized in that the free-radical forming catalyst (c) is an oil soluble organic peroxide.

6. The resin composition of claim 1 further characterized in that the free-radical forming catalyst (d) is selected from the group consisting of tert.-butyl peroctoate, tert.-butyl perisobutyrate, methylethylketone hydroperoxide, benzoyl peroxide, chlorobenzoyl peroxide, and dichlorobenzoyl peroxide.

References Cited

UNITED STATES PATENTS

| 2,899,403 | 8/1959 | Lewis | 260—827 |
| 2,909,548 | 10/1959 | Bailey et al. | 260—827 |
| 3,070,573 | 12/1962 | Beck | 260—827 |
| 3,075,941 | 1/1963 | Wynstra et al. | 260—827 |

SAMUEL H. BLECH, Primary Examiner

U.S. Cl. X.R.

117—161, 232; 161—193; 252—426; 260—37